United States Patent [19]

Amodeo et al.

[11] Patent Number: 4,595,292
[45] Date of Patent: Jun. 17, 1986

[54] APPARATUS FOR DETECTING COHERENT RADIATION AND UNEQUAL PATH INTERFEROMETERS

[75] Inventors: Ralph J. Amodeo, Bethel; William Krohn, Danbury, both of Conn.

[73] Assignee: The Perkin-Elmer Corporation, Norwalk, Conn.

[21] Appl. No.: 518,727

[22] Filed: Jul. 29, 1983

[51] Int. Cl.⁴ ............................................. G01J 9/02
[52] U.S. Cl. ............................... 356/346; 350/347 V; 356/352
[58] Field of Search .............................. 356/346, 352; 350/347 V

[56] References Cited

U.S. PATENT DOCUMENTS 3,824,018 7/1974 Crane, Jr. .
4,170,416 10/1979 Fencil .
4,222,667 9/1980 Layne .
4,309,108 1/1982 Siebert .

FOREIGN PATENT DOCUMENTS 35424 3/1983 Japan .................................. 356/352

Primary Examiner—Davis L. Willis
Assistant Examiner—Matthew W. Koren
Attorney, Agent, or Firm—Thomas P. Murphy; Edwin T. Grimes; Francis L. Masselle

[57] ABSTRACT

The present invention is directed to an improved unequal path interferometer which is a particularly adapted, among many other possible uses, for detecting coherent radiation in the presence of non-coherent ambient radiation, which comprises an unequal optical path length interferometer of the type in which portions of the radiation impinging on the interferometric component are caused to be recombined after travelling two different optical paths; the optical paths differing in length by an amount substantially greater than the coherence length of the non-coherent radiation but substantially less than the coherence length of the coherent radiation; the unequal optical path length interferometric component comprising a liquid crystal cell having dielectric anisotropic properties; elements for applying a time varying electric field vector to the liquid crystal cell to vary the effective index of refraction of the liquid crystal cell in a preselected systematic manner; and elements for detecting the intensity of the recombined portions and producing a signal representative thereof, said signal having a variable component caused by the varying constructive and destructive interference of the recombined coherent radiation components, while the recombined non-coherent radiation components produce only a substantially steady background signal.

8 Claims, 3 Drawing Figures

APPARATUS FOR DETECTING COHERENT RADIATION AND UNEQUAL PATH INTERFEROMETERS

FIELD OF INVENTION

The present invention relates to unequal path interferometers. Interferometers constructed in accordance with the concepts of this invention are adapted, among other possible uses, for use in detecting coherent radiation, as from a laser, in a packet of radiation including incoherent radiation. The interferometer of the invention is also useful in the commercial instrument area.

Unequal path interferometers may take any one of a number of various different forms such as a Michelson or Fizeau for example. A presently preferred form comprises a Fabry-Perot etalon.

This application is closely related to Patent Application entitled "Coherent Radiation Detecting Apparatus" bearing Ser. No. 518,729 and filed on even date herewith.

BACKGROUND OF INVENTION

A Fabry-Perot etalon interferometer consists normally of two plane, parallel partially reflecting surfaces formed on a solid glass spacer so that one portion of incident radiation is transmitted directly through while other portions, being reflected between the partially reflecting surfaces before emerging, are transmitted over a longer path.

As described in U.S. Pat. No. 3,824,018 issued July 16, 1974, and assigned to the same assignee as the present application, a Fabry-Perot etalon is adapted to discriminate coherent radiation by making the optical thickness of the glass spacer sufficiently less than the absolute coherence length of the incident radiation (i.e. the absolute of the coherence length of the coherent and incoherent incident radiation) so that the absolute coherent length will be substantially less than the difference between the lengths of the paths of the directly and the indirectly transmitted radiation (i.e. the optical path difference or OPD). Then, by changing the path length, by means of tilting the etalon, the intensity of the incoherent radiation transmitted will remain constant, but the coherent radiation modulates. This intensity of radiation transmitted through the etalon is a function of the OPD and of the wavelength of the radiation. The OPD is a function of the index of refraction of the spacer, of the thickness of the spacer and the angle of refraction of the radiation passing through the interior of the spacer. As the etalon is tilted in a scanning mode at a predetermined rate to vary the optical path lengths, and the OPD, the intensity of the transmitted radiation, suitably detected by a photodetector at the back of the etalon, varies in a manner such that the frequency of the radiation picked up by the detector decreases and reaches a minimum as the etalon swings through a position at which the angle of incidence of the impinging radiation, and hence the angle of refraction is zero. By this means the etalon is utilized to detect the presence and the relative position of the source of the coherent radiation.

Other related patents in this field include U.S. Pat. No. 4,170,416 issued Oct. 9, 1979; U.S. Pat. No. 4,222,667 dated Sept. 16, 1980 and U.S. Pat. No. 4,309,108 dated Jan. 5, 1982. The present invention is intended as an improvement over the foregoing patents for particular installations.

SUMMARY OF THE INVENTION

Briefly, the present invention is directed to apparatus for detecting the presence of radiation in the presence of non-coherent ambient radiation which is characterized by an unequal optical path length interferometer of a type in which portions of the radiation impinging on the interferometric component are caused to be recombined after travelling two different optical paths. According to the invention, the optical paths differ in length by an amount substantially greater than the coherence length of the non-coherent radiation but substantially less than the coherence length of the coherent radiation. The unequal path length interferometer component comprises a liquid crystal cell having dielectric anisotropic properties. Means are provided for applying a time varying electric field vector to said liquid crystal to vary the effective index of refraction of said liquid crystal cell in a preselected systematic manner. Means are also provided for detecting the intensity of the recombined portions and producing a signal representative thereof, said signal having a variable component caused by the varying constructive and destructive interference of the recombined coherent radiation components, while the recombined non-coherent radiation components produce only a substantially steady background signal.

According to one preferred embodiment of the invention the unequal optical path length interferometric component is a Fabry-Perot etalon. In one form of the invention the liquid crystal cell is fabricated from cyanobiphenyl. In another form of the invention the liquid crystal cell is fabricated from phenylcyclohexane.

In one preferred form of the invention the liquid crystal cell has two partially reflective sides which define the optical path. The time varying electric field vector comprises a first set of electrodes applied to the first partially reflective side, a second set of electrodes alternating with a third set of electrodes applied to the second partially reflective side of the cell and means are provided for controlling the electrical potential applied to the three sets of electrodes to systematically modulate the electrical potential so that gradually the major component thereof extends from a path between the first and second electrodes to a path between the first and third electrodes and then returns to a path between the first and second electrodes over a period of time in a systematic manner. As a result the liquid crystals in the cell align themselves to and track the electric field to change the angle of the liquid crystal axes with respect to the optical axis and thereby change the index of refraction of the cell.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims apppended hereto. Those skilled in the art will appreciate that the conception upon which this disclosure is based may readily be utilized as a basis for the designing of other structures for carrying out the several purposes of the invention. It is important, therefore, that the claims be regarded as including such equivalent structures as do not depart from the spirit and scope of the invention.

Several embodiments of the invention have been chosen for purposes of illustration and description, and are shown in the accompanying drawings, forming a part of the specification.

DETAILED DESCRIPTION OF THE INVENTION

It will be appreciated that many different forms of unequal path interferometers may be employed to carry out the concepts of this invention such as, a Fabry-Perot, Michelson or Fizeau, for example. However, it is necessary to provide means for varying the radiation or optical path difference, as will be explained more fully hereinafter. It has been found that a Fabry-Perot interferometer or etalon is particularly desirable for carrying out the invention.

Figure 2:
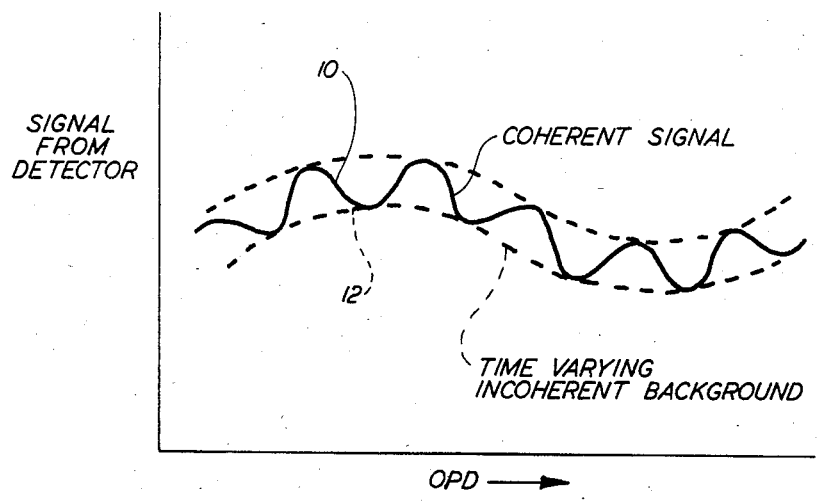
FIG. 2 is a schematic illustration of the wave forms produced by the detector of FIG. 1.

In one form of the invention a Fabry-Perot interferometer or etalon is used for determining the existence of a coherent source in the presence of incoherent background. The background or incoherent illumination is not modulated by the Fabry-Perot etalon, but remains in the form of a "constant" illumination. That is, the transmission of the etalon will remain constant, independent of the optical path difference, i.e. independent of the angle, wavelength, and etalon thickness. However, for coherent illumination, the transmission of the etalon is a function of the optical path difference (OPD). As a result the coherent or laser radiation is modulated by the etalon while the background or incoherent radiation is substantially not modulated. This is illustrated in FIG. 2 wherein the detected signal is plotted as a function of the optical path difference (OPD). The modulated coherent signal is indicated at 10 and the substantially unmodulated incoherent background signal is indicated by the slowly changing dotted lines at 12.

The optical path difference (OPD) is derived from the following relationship;

$$OPD = 2 \, n \, d \, \cos \theta'$$

where:

Cos $\theta'$ is related to the angle of incidence,
n = index of refraction of etalon,
d = thickness of etalon.

Preselected constant etalon thickness and constant angle of incidence, depending upon the desired spectral range, are selected to allow such lasers to be modulated while still not modulating the background. Modulation is effected by varying the index of refraction (n) of the etalon in a controlled systematic manner. Thus, as seen in FIG. 2, the coherent signal is rapidly modulated directly in response to the change in the index of refraction, while the incoherent background merely varies slowly with time.

Figure 1:
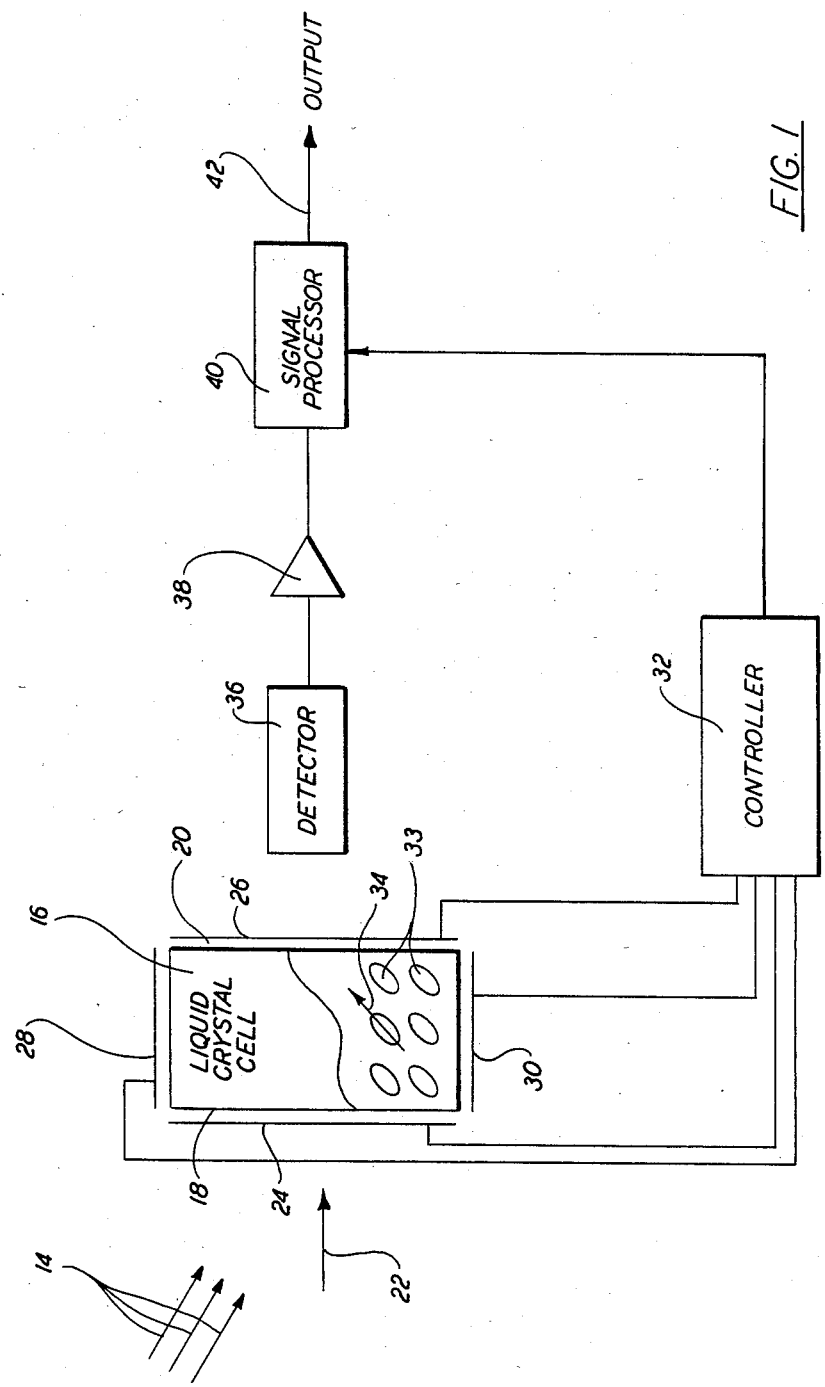
FIG. 1 is a schematic diagram of an etalon detector apparatus constructed according to the concepts of the present invention.

Referring to FIG. 1 radiation is received by the apparatus as indicated by arrows 14. This radiation is made up of incoherent radiation and possibly coherent radiation, the presence of which is to be detected.

A liquid crystal such as cyanobiphenyl or phenylcyclohexane exibiting high transmission in the 8 to 12 $\mu$m region and the desired dielectric anisotropic properties is contained in a cell 16. Dielectric anisotropic refers to differences in dielectric constants parallel and perpendicular to the applied electric field. The cell 16 has two partially reflective sides 18 and 20 which define the optical path. A first electric field is applied to the cell 16 in the direction of the optical axis 22 by means of electrodes 24 and 26, and a second electric field is applied to the cell 16 in an orthogonal direction by means of conductors 28 and 30. The electrical potential applied to these conductors is controlled by controller 32. For example, the voltages applied are of the order of about 5 to about 100 volts, depending upon the material and the thickness of the etalon. The components applied to the two orthogonal fields are varied in a systematic manner so that a vector sum is applied to the cell 16 which rotates with time. That is, by applying a time varying electric field vector to the cell the molecules or liquid crystals 33 will align themselves to and track the electric field. This causes the molecule axes, indicated at 34, to change angle with respect to the optical axis 22. This change in index changes the index of refraction of the etalon and hence the optical path difference through the cell, which changes the transmission of coherent, laser, light while the background light, being non-coherent, is not affected by this change in index to any significant extent.

Still referring to FIG. 1, the optical output or transmission from the liquid crystal cell 16 is monitored by an optical radiation detector 36, which provides an electric signal that is amplified by amplifier 38. This signal is inputted to a signal processor 40, which also receives a signal from the controller 32 that is responsive to the modulation of the electric field applied to the liquid crystal cell 16. The function of the signal processor 40 is to detect a signal which is synchronous with the modulating signal. The presence of this synchronous signal corresponds to the presence of a laser and the result of this comparison is outputted at 42.

Figure 3:
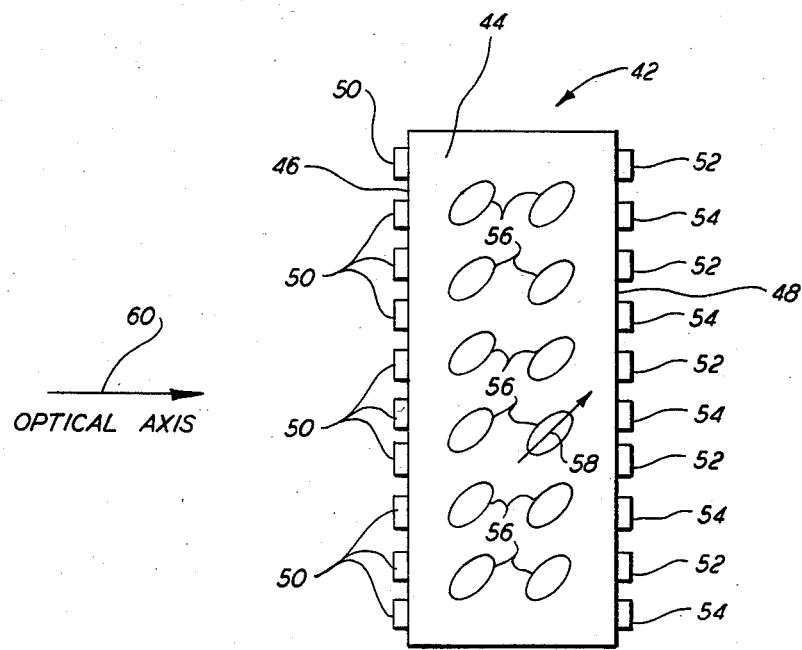
FIG. 3 is an enlarged schematic diagram of an etalon assembly according to one form of the invention.

FIG. 3 shows another embodiment of the liquid crystal cell assembly, as indicated generally at 42. This assembly includes a liquid crystal cell 44 having two partially reflective sides 46 and 48, which define the optical path. A first set of electodes 50 are applied to the first side 46 of the cell. A second set of electrodes 52 alternating with a third set of electrodes 54 are applied to the second side 48 of the cell. Control of the electrical potential applied to the three sets of electrodes serves to systematically modulate the electrical potential so that gradually the major component thereof extends from a path between the electrodes 50 and 52 to a path between the electrodes 50 and 54 and then returns through a path between the electrodes 50 and 52, over a period of time in a systematic manner. That is, by applying a time varying electric field vector to the cell, the molecules or liquid crystals 56 will align themselves to and track the electric field. This causes the molecule axes, indicated at 58, to change angle with respect to the optical axis 60. This change in index changes the index of refraction of the etalon and hence the optical path difference through the cell, which changes the transmission of coherent, laser, light while the background light, being non-coherent is not affected by this change in index to any significant extent.

It will thus be seen that the present invention does indeed provide a new and improved apparatus for detecting coherent radiation which provides a low power, completely electronic (no mechanical moving parts), apparatus for altering the optical path length in a Fabry-Perot etalon. Although specific embodiments have been illustrated and described, it will be obvious to those skilled in the art that various modifications may be made without departing from the spirit and scope of the invention which is to be limited solely by the appended claims.

What is claimed is:

1. Apparatus for detecting the presence of coherent radiation in the presence of non-coherent ambient radiation comprising;
   a Fabry-Perot etalon interferometer of the type in which portions of the radiation impinging on the interferometric component are caused to be recombined after travelling two different optical paths;
   said optical paths differing in length by an amount substantially greater than the coherence length of the non-coherent radiation but substantially less than the coherence length of the coherent radiation;
   said unequal optical path length interferometric component comprising a liquid crystal cell having dielectric anisotropic properties;
   means for applying a time varying electric field vector to said liquid crystal cell to vary the effective index of refraction of said liquid crystal cell in a preselected systematic manner comprising a first electric field applied to said liquid crystal cell in the direction of the optical axis and a second electric field applied to said liquid crystal cell in an orthogonal direction, the electrical potential applied to said electrical fields being varied in a systematic manner so that a vector sum is applied to the cell which rotates with time;
   means for detecting the intensity of said recombined portions and producing a signal representative thereof, said signal having a variable component caused by the varying constructive and destructive interference of the recombined coherent radiation components, while the recombined non-coherent radiation components produce only a substantially steady background signal.

2. Apparatus according to claim 1 wherein said liquid crystal cell is fabricated from cyanobiphenyl.

3. Apparatus according to claim 1 wherein said liquid crystal cell is fabricated from phenylcyclohexane.

4. In an unequal optical path length interferometer, a Fabry-Perot etalon comprising a liquid crystal cell having dielectric anisotropic properties, means for applying a time varying electric field vector to said liquid crystal cell to vary the effective index of refraction of said liquid crystal cell in a preselected systematic manner, said means for applying a time varying electric field vector comprises a first electric field applied to said liquid crystal cell in the direction of the optical axis and a second electric field applied to said liquid crystal cell in an orthogonal direction, the electrical potential applied to said electrical fields being varied in a systematic manner so that a vector sum is applied to the cell which rotates with time.

5. Apparatus according to claim 4 wherein said liquid crystal cell is fabricated from cyanobiphenyl.

6. Apparatus according to claim 4 wherein said liquid crystal cell is fabricated from phenylcyclohexane.

7. Apparatus for detecting the presence of coherent radiation in the presence of non-coherent ambient radiation comprising:
   a Fabry-Perot etalon interferometer of the type in which portions of the radiation impinging on the interferometric component are caused to be recombined after travelling two different optical paths;
   said optical paths differing in length by an amount substantially greater than the coherence length of the non-coherent radiation but substantially less than the coherence length of the coherent radiation;
   said unequal optical path length interferometric component comprising a liquid crystal cell having dielectric anisotropic properties;
   means for applying a time varying electric field vector to said liquid crystal cell to vary the effective index of refraction of said liquid crystal cell in a preselected systematic manner, said liquid crystal cell has two partially reflective sides which define the optical path, and wherein said means for applying a time varying electric field vector comprises a first set of electrodes applied to the first partially reflective side, a second set of electrodes alternating with a third set of electrodes applied to the second partially reflective side of the cell and means for controlling the electrical potential applied to the three sets of electrodes to systematically modulate the electrical potential so that gradually the major component thereof extends from a path between the first and second electrodes to a path between the first and third electrodes and then returns to a path between the first and second electrodes over a period of time in a systematic manner, whereby the liquid crystals in the cell will align themselves to and track the electric field to change the angle of the liquid crystal axes with respect to the optical axis and thereby change the index of refraction of the cell;
   means for detecting the intensity of said recombined portions and producing a signal representative thereof, said signal having a variable component caused by the varying constructive and destructive interference of the recombined coherent radiation components, while the recombined non-coherent radiation components produce only a substantially steady background signal.

8. In an unequal optical path length interferometer, a Fabry-Perot etalon comprising a liquid crystal cell having dielectric anisotropic properties, means for applying a time varying electric field vector to said liquid crystal cell to vary the effective index of refraction of said liquid crystal cell in a preselected systematic manner, said liquid crystal cell has two partially reflective sides which define the optical path, and wherein said means for applying a time varying electric field vector comprises a first set of electrodes applied to the first partially reflective side, a second set of electrodes alternating with a third set of electrodes applied to the second partially reflective side of the cell and means for controlling the electrical potential applied to the three sets of electrodes to systematically modulate the electrical potential so that gradually the major component thereof extends from a path between the first and second electrodes to a path between the first and third electrodes and then returns to a path between the first and second electrodes over a period of time in a systematic manner, whereby the liquid crystals in the cell will align themselves to and track the electric field to change the angle of the liquid crystal axes with respect to the optical axis and thereby change the index of refraction of the cell.

* * * * *